United States Patent [19] [11] Patent Number: 4,537,423
Nau et al. [45] Date of Patent: Aug. 27, 1985

[54] BALLAST WEIGHT ARRRANGEMENT ON AGRICULTURAL PRIME MOVERS

[75] Inventors: Walter Nau, Cologne; Jes Carstensen, Erftstadt, both of Fed. Rep. of Germany

[73] Assignee: Klöckner-Humboldt-Deutz Aktiengesellschaft, Cologne, Fed. Rep. of Germany

[21] Appl. No.: 406,934

[22] Filed: Aug. 10, 1982

[30] Foreign Application Priority Data

Aug. 11, 1981 [DE] Fed. Rep. of Germany ....... 3131686

[51] Int. Cl.³ ............................................. B60R 11/00
[52] U.S. Cl. ..................................... 280/759; 212/195
[58] Field of Search ....................... 280/759, 755, 757; 212/195

[56] References Cited

U.S. PATENT DOCUMENTS 3,888,507 6/1975 Berghausen ........................ 280/759

FOREIGN PATENT DOCUMENTS 2512721 9/1976 Fed. Rep. of Germany ...... 280/759
0049518 4/1977 Japan ................................. 280/759

Primary Examiner—Joseph F. Peters, Jr.
Assistant Examiner—J. McCarthy
Attorney, Agent, or Firm—Becker & Becker, Inc.

[57] ABSTRACT

Plate-like ballast weights attached by noses to a support or carrier element located at the front of an agricultural prime mover. The nose of each individual ballast weight is spaced from the rest of the ballast weight by such an amount that the latter can be hung by the nose on the support or carrier element in a hanging-in or attaching position, and can subsequently be pivoted into its end position with the nose on a slope or inclination of the support or carrier element. A projection in the lower region of the ballast weight catches in a recess in the end position of the support or carrier element. The ballast weights can be secured in this end position by an arresting arrangement in the region of the noses thereof.

5 Claims, 7 Drawing Figures

BALLAST WEIGHT ARRRANGEMENT ON AGRICULTURAL PRIME MOVERS

The present invention relates to a ballast weight arrangement on agricultural prime movers or tractors. Plate-like ballast weights, by means of projecting noses provided in the upper region thereof, can be individually hung in a support or carrier element, preferably a jaw on the front end, arranged transverse to the longitudinal middle axis of the tractor or prime mover.

In the foregoing type of ballast weight arrangement, disclosed in German Auslegeschrift No. 23 33 169, the plate-like ballast weights have hook-shaped noses, which have wedge-shaped engagement surfaces, and are hung or suspended in likewise wedge-shaped engagement surfaces of the support or carrier element. A threadless rod consisting of round material is arranged at the underside of the support or carrier element on the one hand in semi-cylindrical recesses of the support or carrier element, and on the other hand in semi-cylindrical recesses of the ballast weights, for locking the individual ballast weights against a pivoting or swinging out in the direction of travel, and a springing out of the hook-shaped noses from the engagement surfaces of the support or carrier element. It has been shown that ballast weights constructed in this manner are very difficult to assemble and disassemble. Great problems are caused for example by the insertion of the locking rod into the paired semi-cylindrical recesses of the support or carrier element and of the ballast weights, since the front wheels, especially with tractors having four-wheel drive, due to restricted space, render difficult a lateral insertion of the locking rod, or even completely prevent such insertion. At the same time, all hung or attached ballast weights must occupy a position, for insertion of the locking rod, in which all semi-cylindrical recesses form an aligned cylindrical bore. However, filling or shifting generally occurs in the bore as a result of casting tolerances, dirt in the wedge-shaped recesses of the support or carrier element, and uneven hanging or suspension of the ballast weights, so that the locking rod cannot be inserted. Also, the withdrawal of the locking rod for disassembly causes difficulties, since friction occurs between the semi-cylindrical recesses of the ballast weights and of the locking rod during withdrawal; this friction leads to a pivoting of individual ballast weights, and finally leads to a binding of the locking rod.

It is therefore an object of the present invention to avoid the aforementioned difficulties and consequently to provide a ballast weight arrangement which is distinguished by a structurally nominal cost and a simple assembly as well as disassembly of the individual plate-like ballast weights, with not only individual but also all of the attachable ballast weights being secured against transverse movements and against springing-out of the support or carrier element.

This object, and other objects and advantages of the present invention, will appear more clearly from the following specification in connection with the accompanying drawings, in which.

Figure 1:
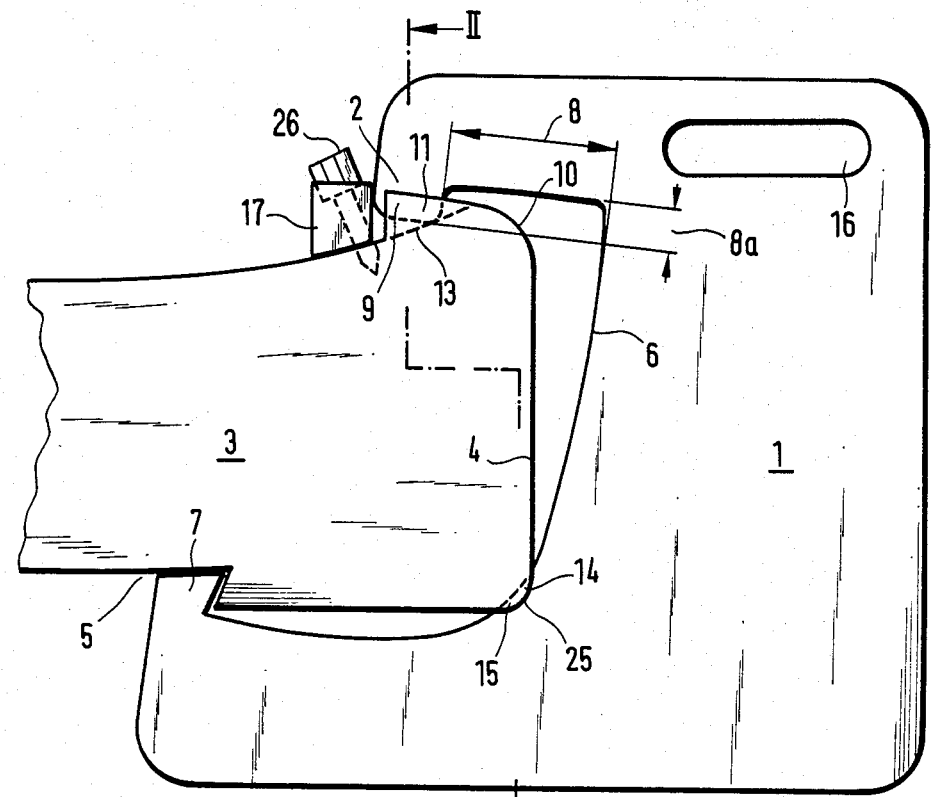
FIG. 1 shows in a simplified manner a side view of one embodiment of an inventive ballast weight arrangement on a support or carrier element having a locking pin or rod.

The ballast weight arrangement of the aforementioned general type is inventively characterized primarily in that each ballast weight has a projection in the region thereof extending below the support or carrier element; the projection projects or extends into a corresponding recess or behind a step or shoulder of the support or carrier element; the nose is spaced from that upper inner side of the ballast weight which faces the end face of the support or carrier element by such a distance, and a recess of such a depth is provided therebetween, that when the inner side of the ballast weight rests against the support or carrier element, i.e. when the upper edge of the support or carrier element rests against the upper inner side of the ballast weight, the projection can be pivoted over the lower edge and the part of the support or carrier element located ahead of the recess or the step thereof; furthermore, when pivoting the ballast weight into its end position, it is lifted by a slope or inclination of the carrier element which cooperates with the nose, to such an extent that the projection engages or catches in the recess or behind the step, and that the ballast weight can be locked or arrested in its end position.

By the particular coordination of the dimensions and the shape of the individual ballast weights and of the support or carrier element, as well as by the inclination provided on the support or carrier element, there is attained, when a ballast weight which has its upper nose hung on the support or carrier element is pivoted into its end position, an automatic hooking or engaging of the ballast weight on the support or carrier element in the poorly accessible lower region thereof. It is now only necessary to hold the nose of the respective ballast weight in this end position by a locking or arresting means. When the nose is pivoted out of its end position for disassembly purposes, the lower projection is simultaneously pivoted out from the recess or from the space behind the step or shoulder of the support or carrier element, so that substantially the ballast weight can be lifted or removed from the support or carrier element.

According to a specific embodiment of the present invention, it is proposed, for locking or arresting the ballast weights in their end position, to provide the inclinations with depressions into which the noses of the ballast weights engage. This type of locking or arresting makes it possible to fix or secure the ballast weights in their end position without any special auxiliary means, such as screws, bolts, locking or arresting pins or rods. The assembly and disassembly of the ballast weights is thus made possible in a very time-saving manner, since during assembly the noses of the ballast weights catch or engage in the depressions, while for disassembly or dismantling, the ballast weights must only be lifted somewhat to allow the noses to be pivoted out of the depression.

According to another embodiment of the present invention, with a locking pin or rod extending parallel to the support or carrier element, it is proposed that the locking rod is fastened to the inclination or slope of the support or carrier element in such a manner that it blocks a pivoting back of the ballast weights into the hanging in or attaching position thereof. This locking rod can be attached with only a few manual actions to an easily accessible location of the support or carrier element. For instance, the locking rod can be fastened on the support or carrier element by means of a cotter pin, or can be fastened on the support or carrier element by means of screws and can be braced against the noses of the ballast weights. Naturally, it is also possible to place the locking rod between the end face of the support or carrier element and the upper inner side of the ballast weights in such a manner that a pivoting back of the ballast weights is prevented.

According to a further embodiment of the present invention, it is proposed that the locking rod is secured by means of an attachment bolt of the jaw on the front of the carrier element. This attachment bolt, which is arranged in bores of the jaw, can be passed through an opening or notch or recess of the locking rod in such a way that the locking rod on the one hand engages against the noses of the ballast weights, and on the other hand, rests against the attachment bolt. The special advantage of securing the locking rod via the attachment bolt is that, aside from the locking rod, no further fastening means are necessary.

Additionally, grooves are proposed to be provided on the support or carrier element in the region of the lower edge thereof, with the ballast weights engaging in these grooves in the end position thereof. In this way, an especially good securing of the ballast weights in position is provided to assure against transverse movements. Alternatively, a frictionally connecting cogging or toothing cam also be provided between the projections of the ballast weights and the recess in the support or carrier element.

Referring now to the drawings in detail, FIGS. 1 to 6 illustrate a plate-like ballast weight 1 having a projecting nose 2 in the upper region thereof; this ballast weight 1 is hung or attached by means of the nose 2 on a support or carrier element 3 carried on the front of an agricultural prime mover or tractor, which is not illustrated. This support or carrier element 3 has an end face 4, and has a recess 5 in the lower region thereof. The ballast weight 1 has an upper inner side 6 facing the end face 4 of the support or carrier elements 3, and has a projection 7 in the lower region thereof. Furthermore, the ballast weight 1 has a portion which is recessed by the distance 8a, and which extends toward the nose 2 from the side 6 by the distance 8; these dimensions are such that the nose 2 of the ballast weight 1 can be hung or attached behind claws 9 on the support or carrier element 3, whereby the upper inner side 6 of the ballast weight 1 rests against an upper edge 10 of the support or carrier element 3. The nose 3 is partially constructed with a wedge profile or shape 11 which rests against likewise wedge-shaped abutment surfaces 12 of the claws 9 in the end position of the ballast weight 1, so that the ballast weight 1 is secured against transverse movements. Additionally, the support or carrier element 3 has a slope or inclination 13 at an upper surface thereof which is provided for the hanging or attachment of the ballast weights 1; the slope or inclination 13 continues from the beginning of the hanging or attachment positioning as far as to the final position, i.e. to the claws 9. Guide grooves 14 are provided on a lower edge 25 of the support or carrier element 3 for transverse fixation of the lower region of the ballast weights 1. The ballast weights 1 engage these guide grooves 14 in the lockable end position thereof by means of a tapered section 15. Handles 16 serve for simpler handling of the ballast weights 1.

Figure 6:
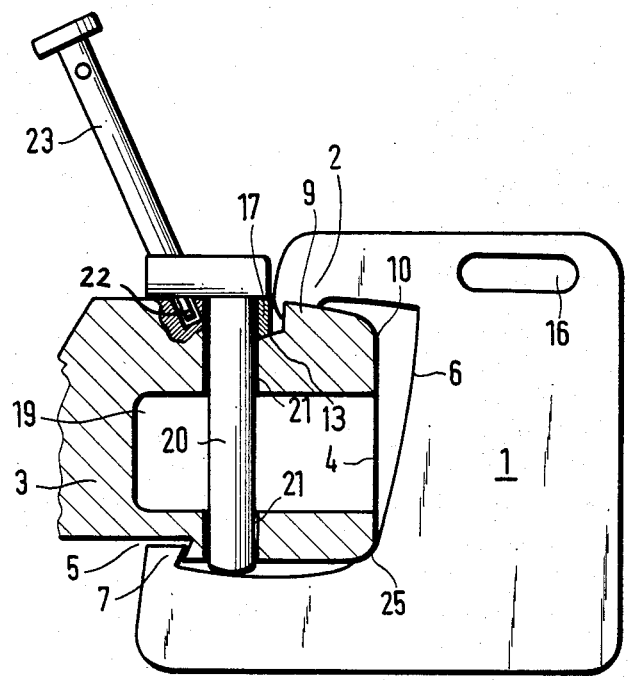
FIG. 6 shows a ballast weight arrangement with a cross section through a support or carrier element which includes a jaw and an attachment bolt, with a locking pin or rod, likewise illustrated in cross section, being fastened via the bolt.

As shown in FIGS. 1 and 6, a locking pin or rod 17 serves to lock or arrest the ballast weights 1 in their final position. The locking pin or rod 17 is fastened on the slope or inclination 13 of the support or carrier element 3, and rests against the noses 2 of the ballast weights 1, so that the ballast weights 1 cannot pivot back into the hanging-in or attaching position.

Figure 2:
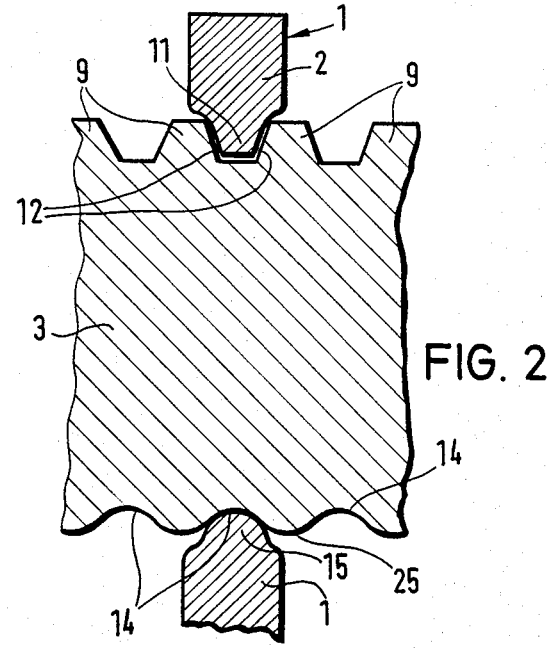
FIG. 2 is a longitudinal section taken along line II—II through the ballast weight arrangement in FIG. 1 in the region of a ballast weight attached to or suspended on the support or carrier element.

FIG. 2, which is a section through the ballast weight arrangement of FIG. 1, clearly shows how the nose 2 of an individual ballast weight 1 is arranged in the wedge-shaped abutment surfaces 12 of the claws 9 of the support or carrier element 3 via its wedge profile or shape 11. The guide grooves 14 are arranged in the lower region of the support or carrier element 3, as further recognizable from this sectional view; the tapered section 15 of the ballast weight 1 engages in these guide grooves 14.

Figure 3:
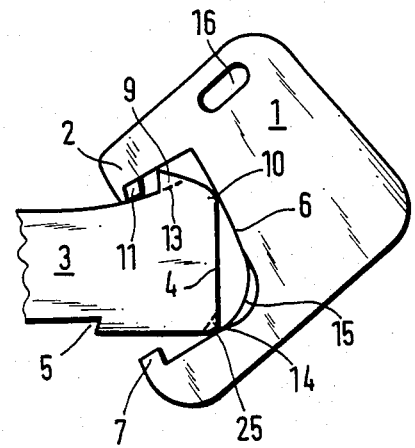
FIG. 3 shows a ballast weight in an attaching position on the support or carrier element.
Figure 4:
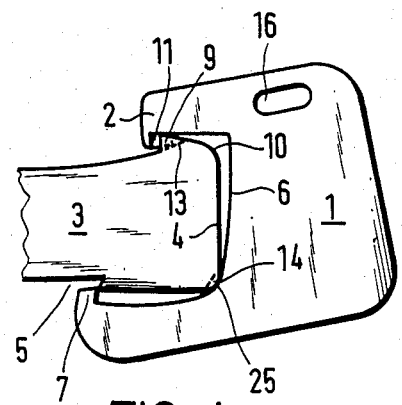
FIG. 4 shows a ballast weight which due to being pivoted has already assumed a position just prior to the final position on the support or carrier element.

The additional views of FIGS. 3 and 4 clearly show how the ballast weights 1 are hung and locked on the support or carrier element 3. FIG. 3 shows the ballast weight 1 in the hanging or attaching position, in which the nose 2 rests at the beginning of the slope or inclination 13, and in which the upper inner side 6 of the ballast weight 1 is supported on the upper edge 10 of the support or carrier element 3. If the ballast weight 1 is pivoted further in a clockwise direction, the nose 2 travels up the slope or inclination 13 to the position illustrated in FIG. 4, in which the projection 7 engages in the recess 5. A still further pivoting of the ballast weight 1 results in that the projection 7 engages securely in the recess 5 in an end position now occupied by the ballast weight 1. Now it only remains to prevent a pivoting back of the ballast weight 1 into the hanging-in or attaching position, such as by an arresting means.

Figure 5:
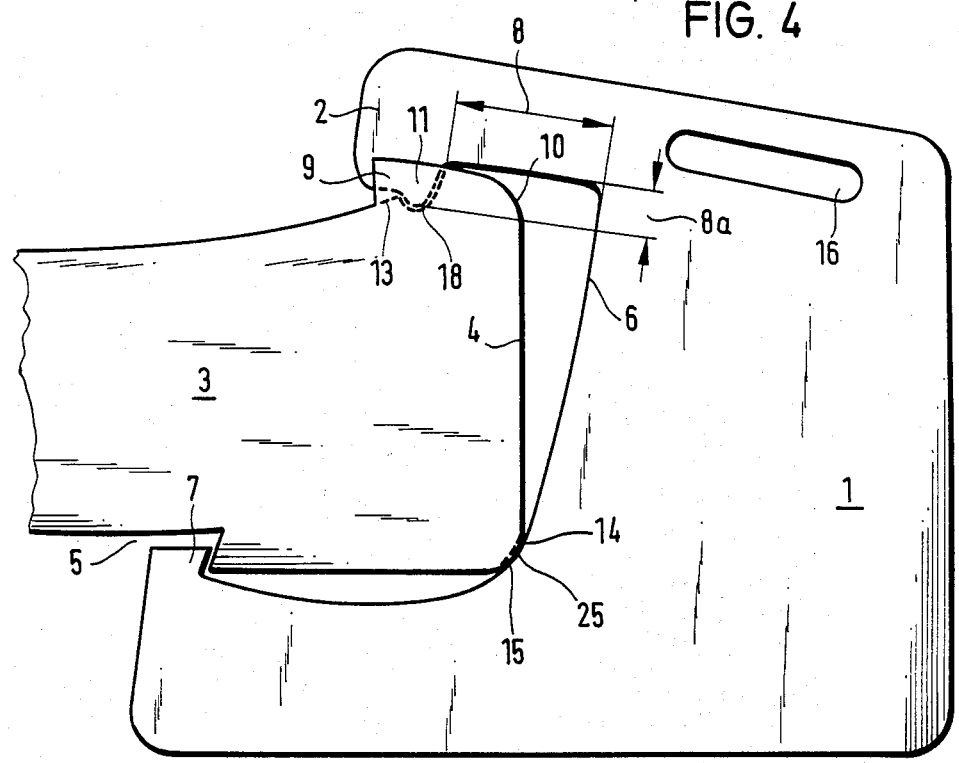
FIG. 5 shows how the nose of a ballast weight which engages in a depression of the support or carrier element.

FIG. 5 shows a further way of arresting the ballast weights 1 in their end position in accordance to the teaching of the present invention. With this embodiment, the locking or arresting is provided as a depression 18 in the slope or inclination 13. The ballast weights 1 lock in these depressions 18 in their end position, so that they can no longer pivot back into the hanging-up or attaching position. In this connection, it should be noted that it is expedient with the ballast weights 1 to select the position of the center of gravity in such a manner that the hung or suspended ballast weights 1 always tray to pivot from the hanging-in or attaching position in the final attached position.

Figure 7:
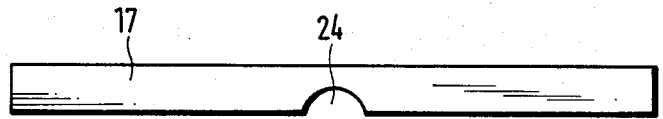
FIG. 7 shows a locking pin or rod for the embodiment of FIG. 6.

FIGS. 6 and 7 illustrate a further advantageous embodiment according to the present invention. The front end of the support or carrier element 3 is provided with a jaw 19 in which work machines can be fastened via an attachment bolt 20 which is inserted in bores 21. This attachment bolt 20 can be secured in a position for coupling the devices via a locking pin 22, which can be actuated by a grip or handle 23. If now the locking rod 17 as illustrated in FIG. 7 is provided with a semi-cylindrical notch or recess 24, the locking rod 17 can be fastened below the attachment bolt 20 by means of this notch or recess 24, and the ballast weights 1 are thus locked or arrested in their end position in a simple manner. As shown in FIG. 1, the locking rod 17 is fastened to the carrier element 3 by screws 26, and is adapted to be braced against the nose 2 of the ballast weight 1.

The present invention is, of course, in no way restricted to the specific disclosure of the specification and drawings, but also encompasses any modifications within the scope of the appended claims.

What is claimed is:

1. A ballast weight arrangement on an agricultural prime mover, said arrangement comprising:

a carrier element arranged on said prime mover transverse to a longitudinal certral axis thereof, said carrier element having an end face remote from said prime mover and extending transverse to the longitudinal central axis thereof; and at least one plate-like ballast weight, each ballast weight having an inner side which faces said end face of said carrier element when said ballast weight in in its attached end position on said carrier element; each ballast weight being provided with a nose by means of which said ballast weight can be attached to said carrier element; and nose, in the attached position of said ballast weight, being provided in the upper region of the latter; each ballast weight also being provided with a projection which, in the attached position of said ballast weight, is located in a region thereof which extends below said carrier element; said carrier element being provided with a corresponding part with which said projection of said ballast weight cooperates in the attached end position of said ballast weight; said nose being spaced from said inner side of said ballast weight by such a distance, and a recess of such a depth being provided on said ballast weight between said nose and said inner side thereof, that when, during an attaching position of said ballast weight, said inner side rests against said carrier element, i.e. when an upper edge of said end face of said carrier element rests against said inner side, said projection of said ballast weight can be pivoted over a lower edge of said end face of said carrier element and over that portion of the latter located ahead of said corresponding part thereof; that surface of said carrier element which faces said nose during attaching and attached positions of said ballast weight being provided with a sloped surface; said nose, when said ballast weight is being pivoted into its attached end position, cooperating with said sloped surface of said carrier element to lift said ballast weight to such an extent that said projection thereof catches in said corresponding part of said carrier element, and that said ballast weight can be arrested in tis attached end position, said sloped surface of said carrier element being provided with a depression for receiving said nose of said ballast weight to effect arresting of the latter in its attached end position.

2. A ballast weight arrangement according to claim 1, which includes a locking rod which extends parallel to said carrier element, said locking rod being fastened to said sloped surface of said carrier element in such a way as to effect arresting of said ballast weight in its attached end position, i.e., to prevent a pivoting back of said ballast weight to an attaching position thereof.

3. A ballast weight arrangement according to claim 2, in which said locking rod is fastened to said carrier element by screws, and is adapted to be braced against said nose of said ballast weight.

4. A ballast weight arrangement according to claim 2, in which said carrier element includes a jaw which is provided with an attachment bolt; and in which said locking rod is fastened to said carrier element by means of said attachment bolt.

5. A ballast weight arrangement according to claim 1, which includes grooves on said carrier element in the vicinity of said lower edge of said end face thereof, said ballast weight being adapted to engage said grooves in its attached end position.

* * * * *